US006829013B2

(12) United States Patent
Thompson et al.

(10) Patent No.: US 6,829,013 B2
(45) Date of Patent: Dec. 7, 2004

(54) METHOD AND APPARATUS FOR DETECTING AND SMOOTHING DIAGONAL FEATURES IN VIDEO IMAGES

(75) Inventors: Laurence A. Thompson, Saratoga, CA (US); Dale R. Adams, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 210 days.

(21) Appl. No.: 10/191,764

(22) Filed: Jul. 8, 2002

(65) Prior Publication Data

US 2003/0052996 A1 Mar. 20, 2003

Related U.S. Application Data

(63) Continuation of application No. 09/396,993, filed on Sep. 15, 1999, now Pat. No. 6,515,706
(60) Provisional application No. 60/100,104, filed on Sep. 15, 1998.

(51) Int. Cl.[7] ................................................. H04N 7/01
(52) U.S. Cl. ........................................ 348/448; 348/452
(58) Field of Search ................................ 348/448, 441, 348/451, 452, 607; H04N 7/01

(56) References Cited

U.S. PATENT DOCUMENTS

| 4,002,827 | A | * | 1/1977 | Nevin |
| 4,689,675 | A | * | 8/1987 | Tchorbajian |
| 4,959,715 | A | | 9/1990 | Prodan |
| 5,347,314 | A | | 9/1994 | Faroudja et al. |
| 5,444,493 | A | | 8/1995 | Boie |
| 5,543,858 | A | | 8/1996 | Wischermann |
| 5,600,731 | A | | 2/1997 | Sezan et al. |
| 5,856,930 | A | | 1/1999 | Hosono |
| 6,014,182 | A | | 1/2000 | Swartz |
| 6,034,733 | A | | 3/2000 | Bairam et al. |
| 6,222,589 | B1 | | 4/2001 | Faroudja et al. |
| 6,266,092 | B1 | | 7/2001 | Wang et al. |
| 6,295,041 | B1 | | 9/2001 | Leung et al. |
| 6,298,144 | B1 | | 10/2001 | Pucker, II et al. |
| 6,545,719 | B1 | | 4/2003 | Topper |
| 2001/0016009 | A1 | * | 8/2001 | Hurst, Jr. |
| 2002/0109790 | A1 | | 8/2002 | Mackinnon |

OTHER PUBLICATIONS

Micron Technology Inc., *Technical Note, Achieve Maximum Compatibility In SDRAM/SGRAM Design*, Compatibility in SDRAM/SGRAM Design, May, 1997.
Micron Technology Inc., *Synchronous DRAM*, 16 MEG: x16 SDRAM, Oct., 1997.

* cited by examiner

*Primary Examiner*—Sherrie Hsia
(74) *Attorney, Agent, or Firm*—Perkins Coie LLP

(57) ABSTRACT

A digital image processor includes an input buffer operable to receive an interlaced video stream and a digital memory for storing portions of the interlaced video stream. An output buffer is operable to transmit a deinterlaced video stream. Also included is a deinterlacing processor coupled between said input buffer and said output buffer and to said digital memory, said deinterlacing processor is operable to store portions of said received interlaced video stream from said input buffer into said digital memory and to detect diagonal features in said portions of said received interlaced video stream in said digital memory, and to generate said deinterlaced video stream having smoothed diagonal features therefrom.

18 Claims, 16 Drawing Sheets

US 6,829,013 B2

METHOD AND APPARATUS FOR DETECTING AND SMOOTHING DIAGONAL FEATURES IN VIDEO IMAGES

CROSS REFERENCE TO RELATED APPLICATIONS

This application is continuation of U.S. application Ser. No. 09/396,993 filed Sep. 15, 1999 now U.S. Pat. No. 6,515,706 and is herein incorporated by reference. This application claims the benefit of U.S. Patent Provisional Application No. 60/100,104 filed on Sep. 15, 1998, and is related to U.S. patent application Ser. No. 09/167,527 filed on Oct. 6, 1998 and U.S. patent application Ser. No. 09/372,715 filed Aug. 11, 1999, all of which are incorporated herein by reference.

BACKGROUND OF THE INVENTION

1. Field of the Invention

The present invention relates generally to the processing of video images and, more particularly, to techniques for detecting and smoothing diagonal features in video images.

2. Description of the Related Art

All major television standards use a raster scanning technique known as "interlacing" or "interlace scanning." Interlace scanning draws horizontal scan lines from the top of the screen to the bottom of the screen in two passes. Each pass is known as a field. In the National Television System Committee (NTSC) standard used in North America, each field takes approximately $\frac{1}{60}^{th}$ of a second to draw.

Interlace scanning depends of the ability of the cathode ray tube (CRT) phosphors to retain an image for a few milliseconds, in effect acting like a "memory" to retain the previous field while the newer interleaved field is being scanned. Interlace scanning provides a benefit in television systems by doubling the vertical resolution of the system without increasing broadcast bandwidth.

FIG. 1 shows a number of parallel horizontal scan lines 10 on a conventional television display. A first set of horizontal lines 12 is scanned in a first field period and then a second set of horizontal lines 14 is scanned in a second field period. Thus, the first field is temporarily shifted by $\frac{1}{60}^{th}$ of a second from the second field. When rapidly changing images are being displayed, an object in motion may appear to be fuzzy due to the temporal displacement between the two fields.

This temporal displacement typically does not create a problem on conventional television displays, primarily because the image of the "older" field quickly fades in intensity as the light output of the phosphors decays. A secondary reason is that the spatial displacement in the images caused by motion results in a fine detail that television displays resolve well. For these reasons, interlace scanning of motion pictures works acceptably well on conventional television displays.

FIG. 2 shows a set of progressively scanned horizontal lines 16. In progressive scanning, all horizontal lines 16, are scanned out in one vertical pass 18, so there is no time displacement of adjacent lines as in interlace scan. Progressive scanning requires a much higher bandwidth signal. Consequently, progressive scanning is typically used for applications where improved image quality and higher resolution are required, relative to conventional television systems. Progressive scanning is widely used in computer CRTs and liquid crystal displays (LCD).

If a motion picture formatted for an interlaced monitor device as in FIG. 1 is to be displayed on a progressively scanned device as in FIG. 2, then it must be converted from the interlaced format to the progressive format. This format conversion is known as deinterlacing. FIG. 3 is a flow diagram of a deinterlace process 19 of the prior art. A first series of interlaced video fields 20 is generated by a video source (not illustrated) at $\frac{1}{60}^{th}$ second intervals.

In this example, each of the video fields 20 has a spatial resolution of 720 horizontal by 240 vertical pixels. Each field contains half the vertical resolution of a complete video image. The first series of video fields 20 are input to a deinterlace processor 22, which converts the 720 by 240 interlaced format to a second series of video fields 24. In this example, each of the second series of video fields 24 may have 720 by 480 pixels where the fields are displayed at 60 frames per second.

FIG. 4 shows a prior art method 25 of deinterlace processing. A video field 26 containing scan lines 30, and a previous video field 28 containing scan lines 32 is fed into a field combination deinterlace processor 34. The result is a combined frame 36 with scan lines 38 sourced from video field 26 and scan lines 40 sourced from video field 28. When this simple deinterlacing of the prior art is performed, and a motion picture formatted for an interlace display is converted to a progressive format, a noticeable "artifact" or error arises because the image content of vertically adjacent lines is time shifted by $\frac{1}{60}^{th}$ second as noted previously. The error is most visible around the edges of objects that are in motion.

FIG. 5 shows a deinterlaced image 42 with a stationary object 43 that is rendered without distortion. FIG. 6 shows an image 44 with the object 43' in motion. The edges of object 43' create artifacts 45 on the edges of the image 44 because of the aforementioned temporal shift. These artifacts 45 are introduced into the image by the conventional field combination deinterlacing method 25 of FIG. 4.

FIG. 7 is an illustration of an alternative prior art method 46 to deinterlace an image using a single reference field rather than two fields. The method 46 interpolates or doubles the number of lines of one field to produce a progressive frame. A video field 48 is scanned from an image to contain a half set of lines 50. The half set of lines 50 is deinterlaced by line interpolation in a deinterlacing interpolator 52.

The resulting frame 54 will have all the lines 50 of the original video field 48. The remaining lines 56 are created by interpolation of lines 50. The resultant image will not have motion artifacts because all the lines in the image will be created from lines 50 that are time correlated. This alternative method 46 of deinterlacing does not produce motion artifacts, but the vertical resolution of the image is reduced by half.

Reduction in vertical resolution is particularly noticeable in areas within the image that have high contrast diagonal features. In this case, the reduction in vertical resolution results in a jagged appearance to diagonal image features. FIG. 8 illustrates a conventional two-dimensional array of pixels 58 in which a high contrast diagonal feature exists. This array 58 is the output of a deinterlace processor. The lines numbered 0, 2, 4, 6, and 8 come from one original video field, and lines 1, 3, 5, and 7 come from the previous original video field.

If a motion artifact is detected in the region of these pixels, then the deinterlace processor will discard the pixels from the previous field in lines 1, 3, 5, and 7. The array 60 containing the remaining pixels in lines 0, 2, 4, 6, and 8 are shown in FIG. 9. The deinterlace processor will then compute the missing pixels from the lines shown in FIG. 9 producing a very jagged image 62 as shown in FIG. 10.

In summary, prior art deinterlacing methods that operate based upon interpolation reduce the vertical resolution of the original image. This reduction in resolution is particularly noticeable in images with high contrast diagonal features. In view of the foregoing, it is desirable to have a method that detects diagonal features and smoothens the jagged appearance caused by a reduction in resolution along diagonal features in areas where deinterlace processing takes place.

SUMMARY OF THE INVENTION

The present invention fills these needs by providing an efficient and economical method and apparatus for detecting and smoothing high contrast diagonal features in video images. It should be appreciated that the present invention can be implemented in numerous ways, including as a process, an apparatus, a system, a device or a method. Several inventive embodiments of the present invention are described below.

In one embodiment of the present invention, a digital image processor is provided. The digital image processor includes a deinterlacing processor coupled between an input buffer operable to receive an interlaced video stream and an output operable to transmit a deinterlaced video stream. The deinterlacing processor is also coupled to a digital memory for storing portions of the interlaced video signal. The deinterlacing processor is operable to detect said diagonal features in the portions of the received interlaced video stream and to generate the deinterlaced video stream having smoothed diagonal features.

In another embodiment of the present invention, a method for deinterlacing an interlaced video stream is provided. The method includes receiving a video frame including a number of pixels from an input of the interlaced video stream. The video frame is analyzed for frequency information inherent to the video frame in order to detect motion artifacts and the magnitude of the motion artifacts in the pixels in the video frame. Diagonal features surrounding the pixels in the video frame are detected if a motion artifact is detected. Each pixel is then mixed with a set of spatially corresponding pixels to generate an output pixel, while using the magnitude of the motion artifacts as a control, to generate an output pixel.

In another embodiment of the present invention, a method for deinterlacing an interlaced video stream is provided. The method includes receiving a video frame including a number of pixels from an input of the interlaced video stream. The video frame is analyzed for frequency information inherent to the video frame in order to detect motion artifacts. A number of motion artifact detection values is determined for the pixels in the video frame. A magnitude for the plurality of motion artifact detection values is then determined. Diagonal features surrounding the pixels in the video frame are detected if a motion artifact is detected. Each pixel is then mixed with a set of spatially corresponding pixels to generate an output pixel, while using the magnitude of the motion artifacts as a control, to generate an output pixel.

An advantage of the present invention is that it allows for detection and smoothing of high contrast diagonal features that result from deinterlacing video images. By reducing the effect of the diagonal features, the processed video image becomes clearer and much less jagged.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings. To facilitate this description, like reference numerals designate like structural elements.

FIG. 18 is a flow chart of a diagonal detection method in accordance with the present invention.

DETAILED DESCRIPTION OF THE PREFERRED EMBODIMENTS

A method and apparatus for diagonal enhancement of the deinterlace process of a video image is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
FIG. 1 shows a number of parallel horizontal scan lines on a conventional television display.
Figure 2:
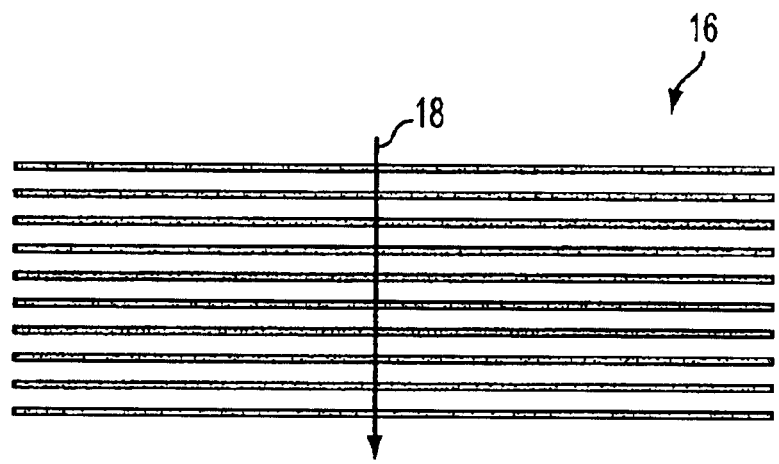
FIG. 2 shows a set of progressively scanned horizontal lines in a prior art progressive scan display.
Figure 3:
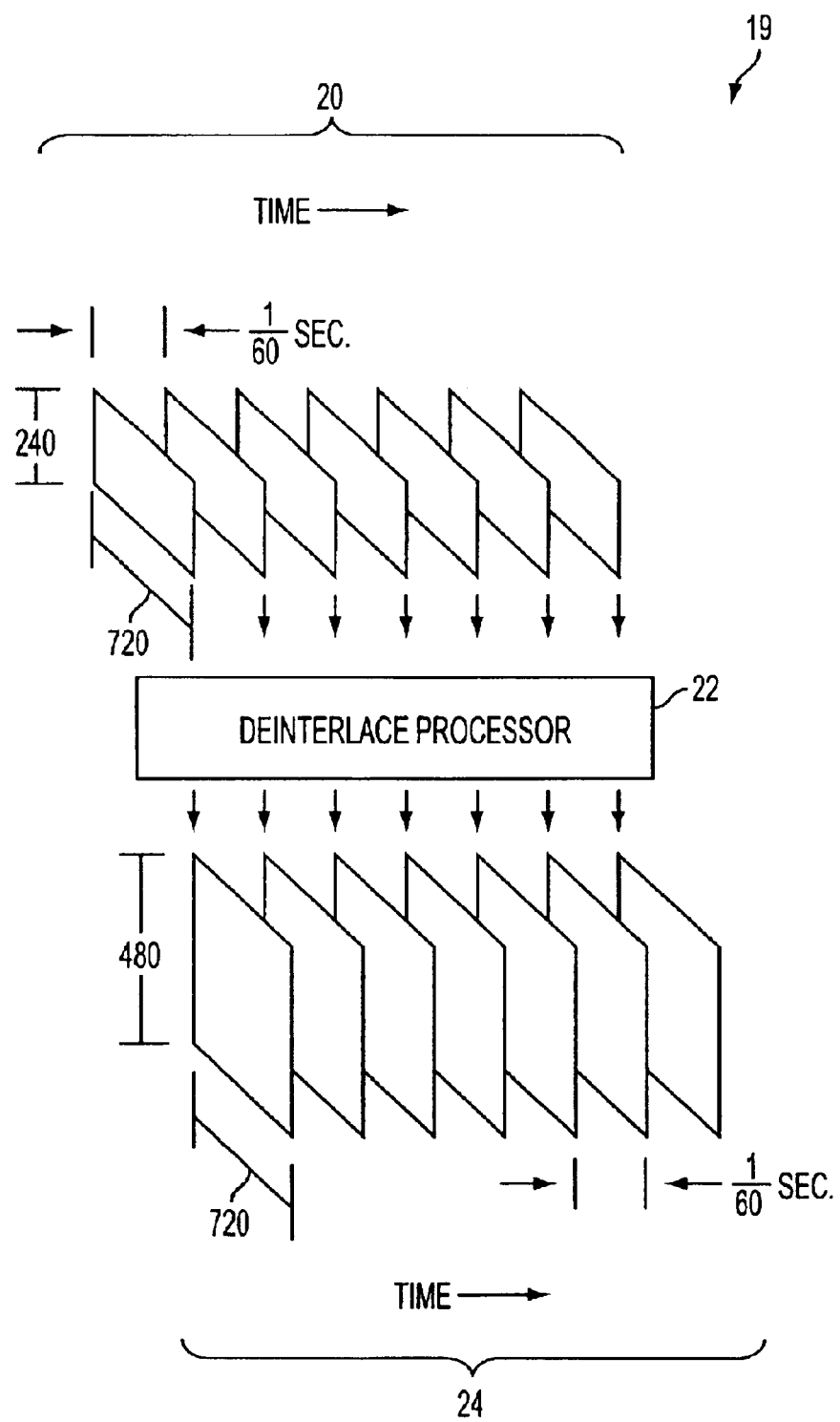
FIG. 3 is an illustration of a deinterlace process of the prior art.
Figure 4:
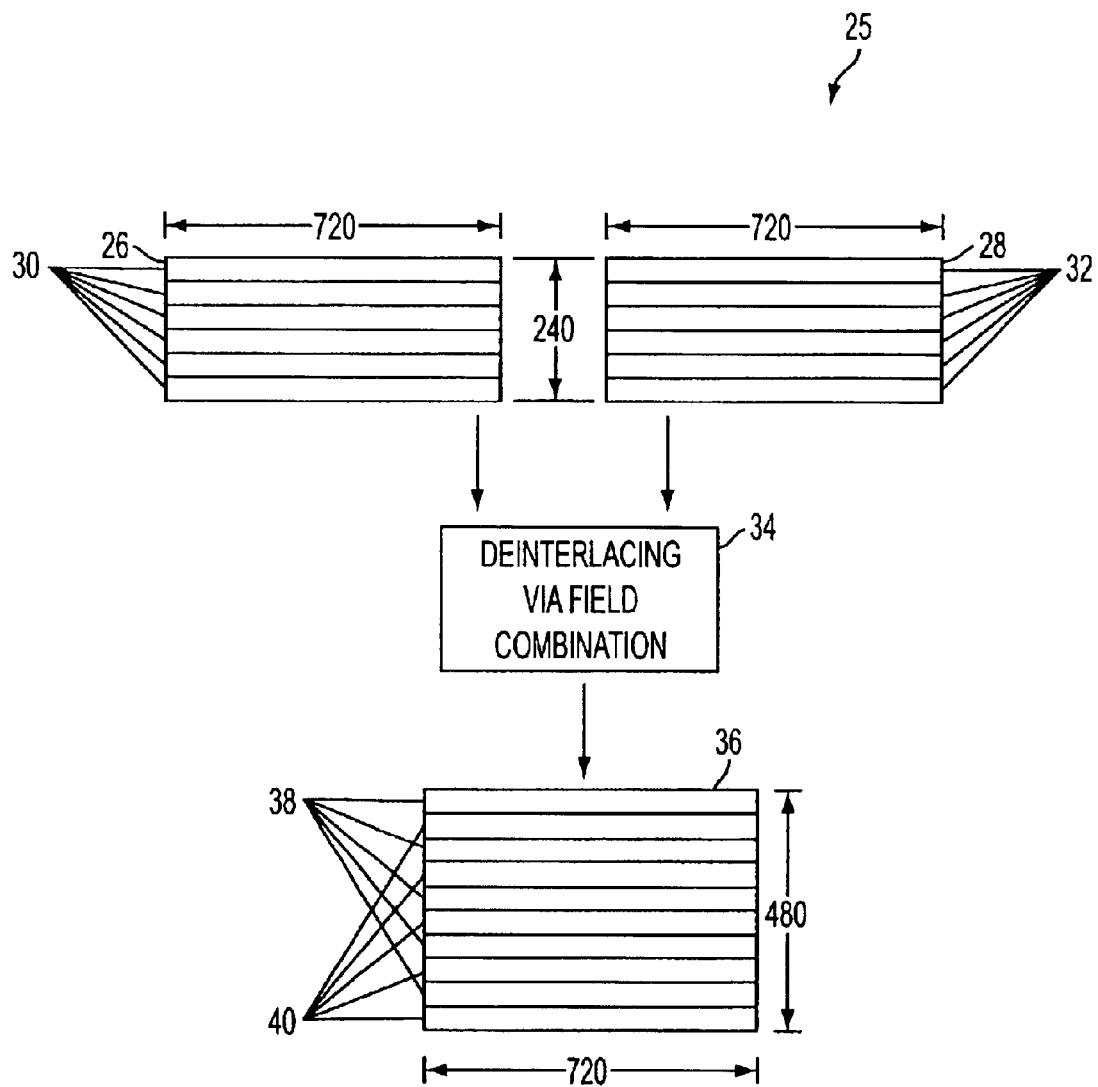
FIG. 4 is a further illustration of deinterlace processing of the prior art.
Figure 5:
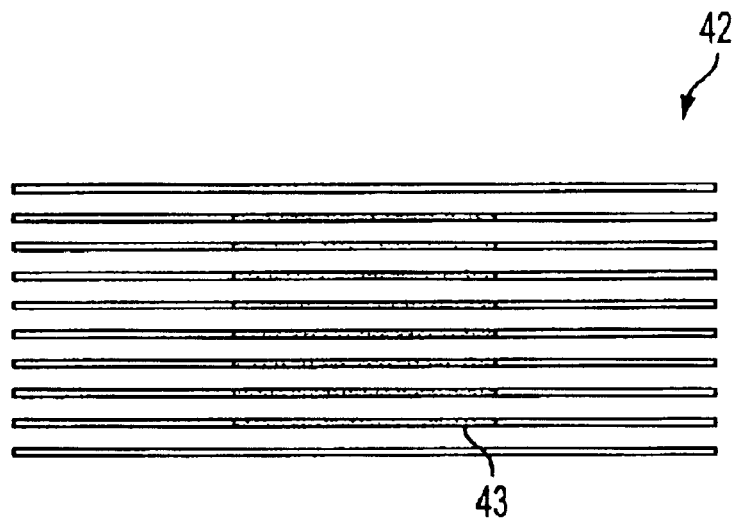
FIG. 5 shows a deinterlaced image of the prior art with a stationary object.
Figure 6:
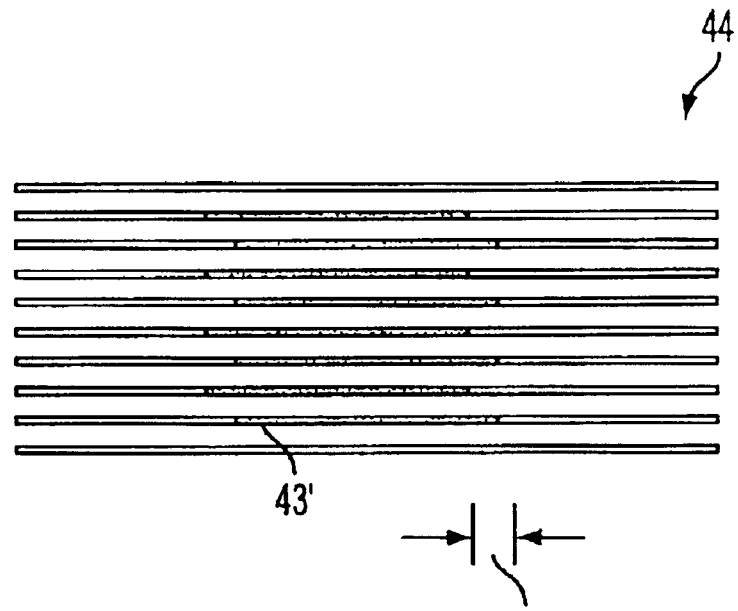
FIG. 6 shows a deinterlaced image of the prior art with an object in motion, creating undesirable "artifacts."
Figure 7:
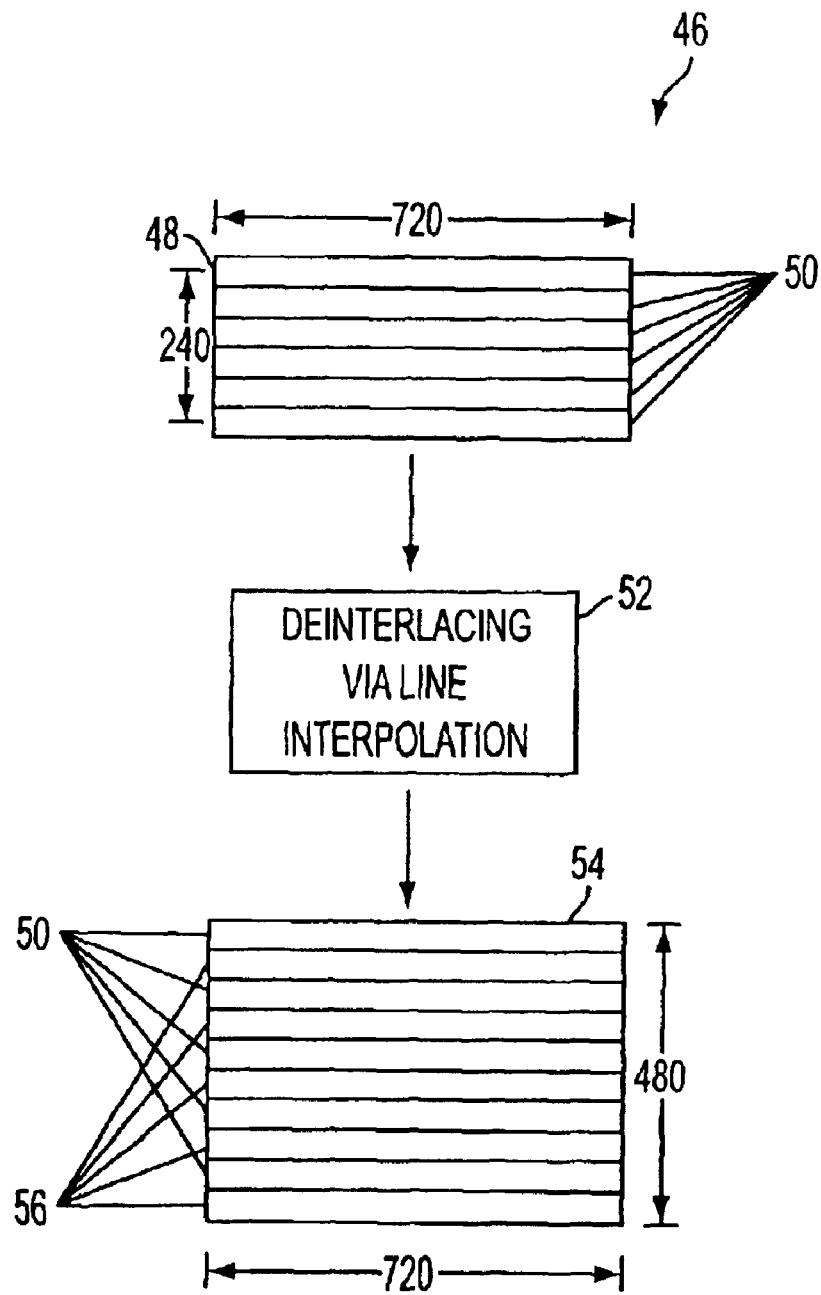
FIG. 7 is a flow diagram of an alternative prior art method to deinterlace an image using a single reference field.
Figure 8:
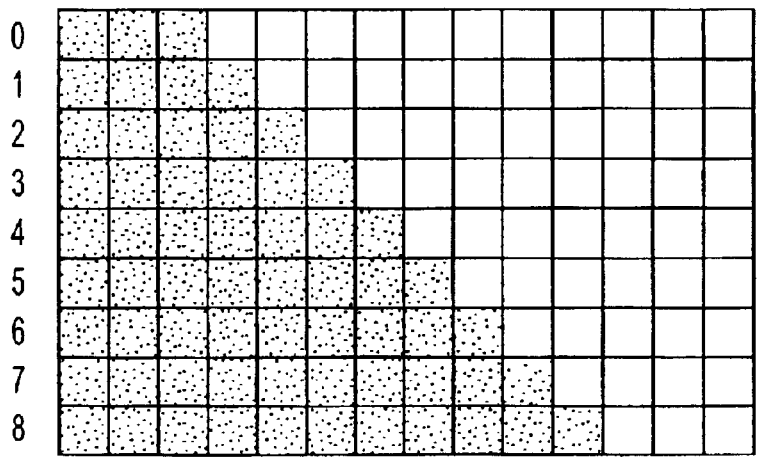
FIG. 8 illustrates a conventional two-dimensional array of pixels in which a high contrast diagonal feature exists.
Figure 9:
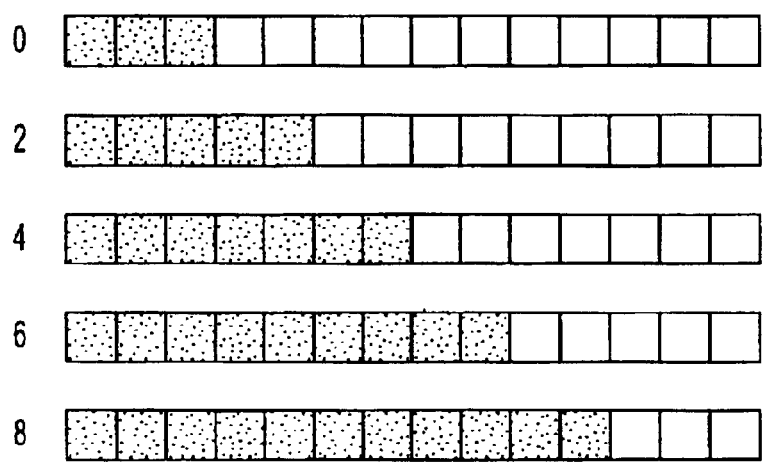
FIG. 9 illustrates an array used in a conventional interpolation deinterlacing system containing half of the pixels in the array of FIG. 8.
Figure 10:
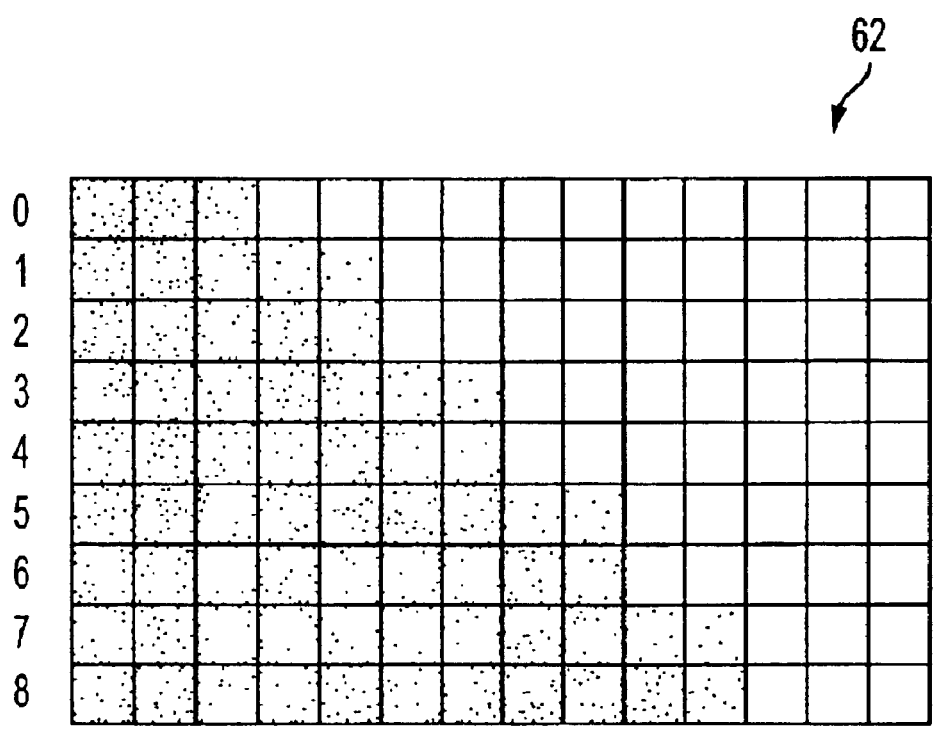
FIG. 10 illustrates an image produced by a prior art deinterlace processor from video fields with high contrast diagonal features.

FIGS. 1–10 were discussed with reference to the prior art. FIG. 4 illustrated the combination of two temporally shifted fields that are adjacent in time, which are combined to create a frame that has double the vertical resolution of each field. For example, if the fields have a resolution of 720 horizontal pixels by 240 vertical pixels, then the combined frame has a resolution of 720 horizontal pixels by 480 vertical pixels. This combined frame will have the full vertical resolution available from the source, but is also prone to having motion artifacts.

Figure 11:
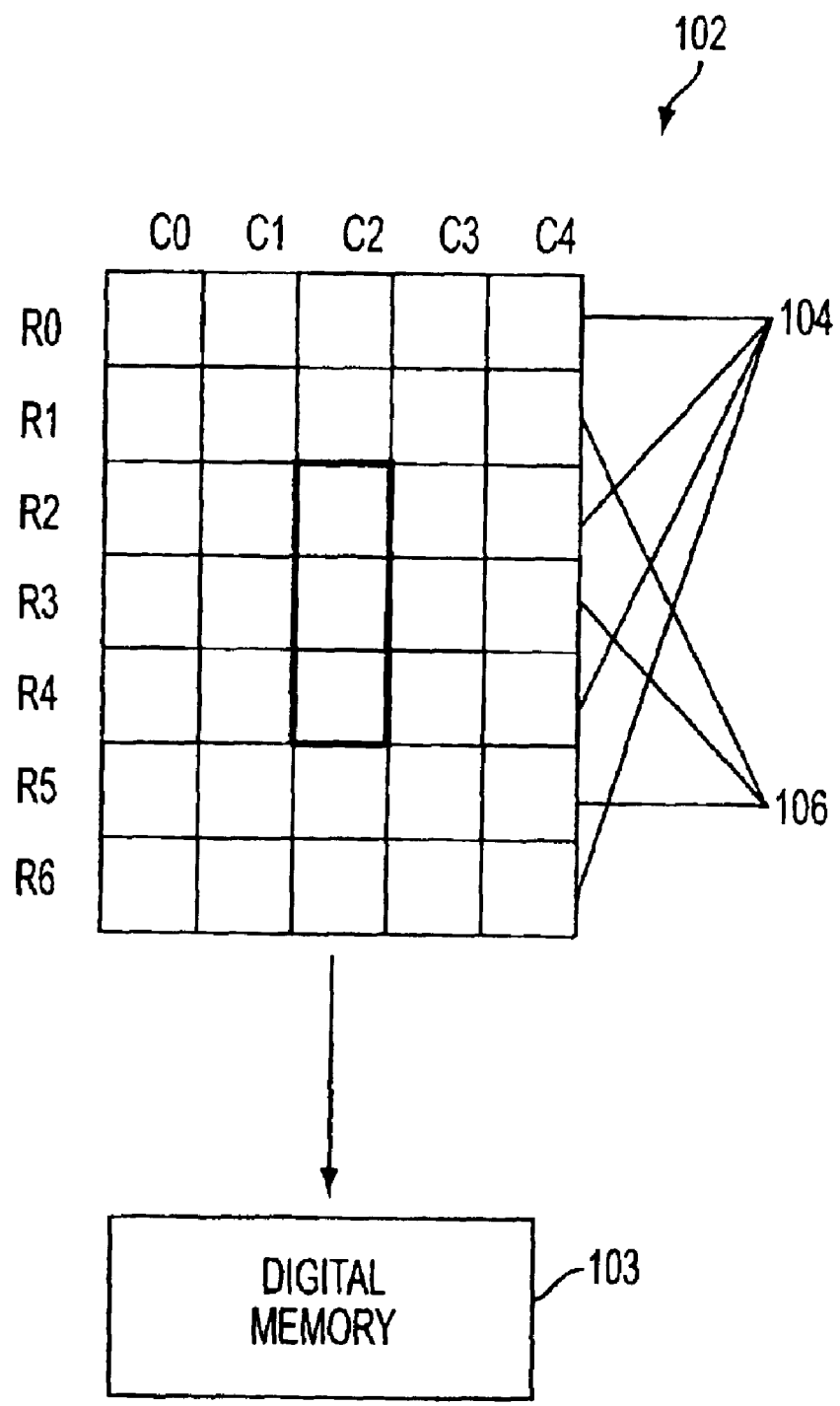
FIG. 11 shows a two-dimensional array of pixel values that is a subset of the combined frame of FIG. 4 that will be used in the description of the present invention.

FIG. 11 shows a two-dimensional array of pixel values 102 that is a subset of the combined frame 36 of FIG. 4. The array is part of the interlaced video stream that is received by an input buffer. The combined frame 36 may be stored in a digital memory 103. Digital memory 103 is used to store portions of the interlaced video stream, and is particularly useful for storing temporally adjacent video fields in the present invention. After deinterlacing, an output buffer is used to transmit the deinterlaced video stream.

The array 102 is shown having a width of 5 pixels and a height of 7 pixels. The array 102 is labeled across the top C0 to C4 indicating columns and is labeled vertically along the left side from the top to bottom R0 to R6 indicating rows. The pixels contained in array 102 are used to compute a frequency detection value, and the array 102 is used to detect diagonal features and finally to compute the resulting pixel.

The array 102 is positioned so that a set of even numbered rows 104 contain pixels from the most recent or "current" field of the original source, and a set of odd numbered rows 106 contain pixels from the previous field. The array 102 is then stepped across the combined frame 36 (see FIG. 4) from left to right horizontally. Each step causes the pixels in each of columns C1, C2, and C3 and C4 to shift to the column to its immediate left. The pixels in column C0 shift out of the array 102, and a new column of pixels shifts into column C4.

After the array 102 has been stepped across all the horizontal positions of the combined frame 36, it is stepped down vertically by two pixels and returned to the left side of the field of the combined frame 36. Therefore, even numbered rows 104 contain pixels from the most recent field and odd numbered lines 106 contain pixels from the previous field. The process then repeats itself as array 102 is then stepped across the combined frame 36 again from left to right horizontally. At each position in the two-dimensional array, a detection value (DV) is calculated.

Figure 12:
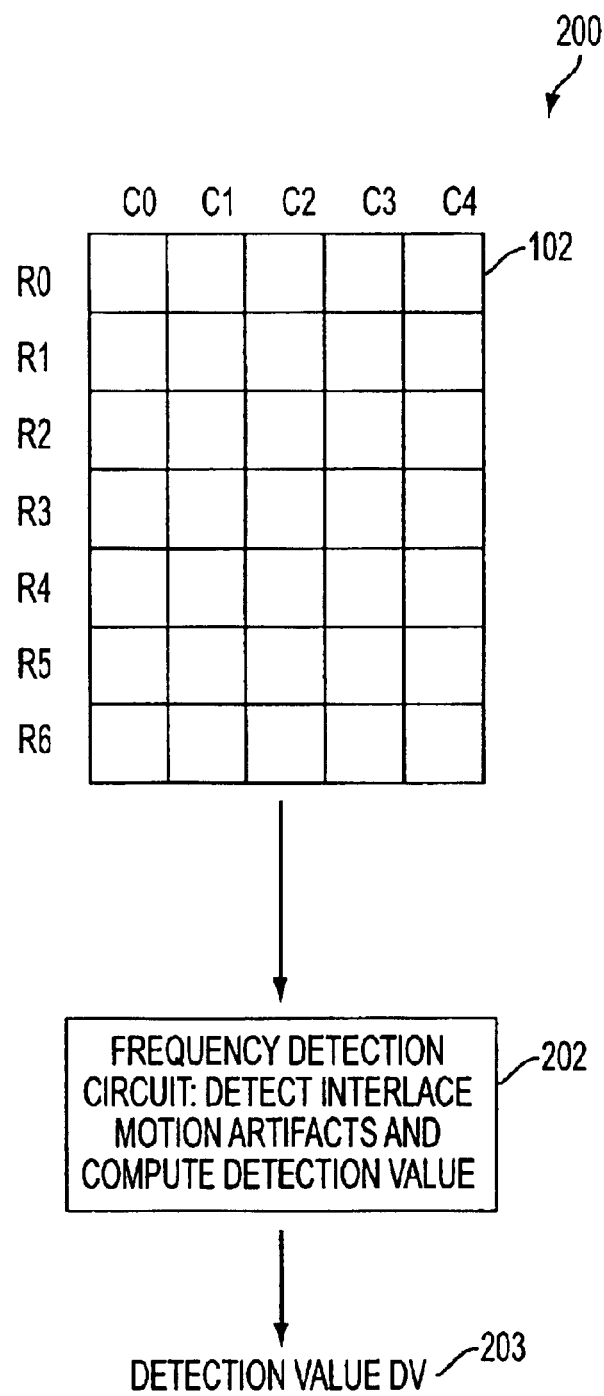
FIG. 12 is a diagram showing a method to calculate detection values in accordance with the present invention.

FIG. 12 is a diagram showing a method 200 to calculate detection values in accordance with the present invention. The array 102 is used to determine the presence of motion artifacts using a frequency detection circuit 202. Interlace motion artifacts in the array 102 are detected by the frequency detection circuit 202 resulting in the computation of a detection value (DV) 203.

Figure 13:
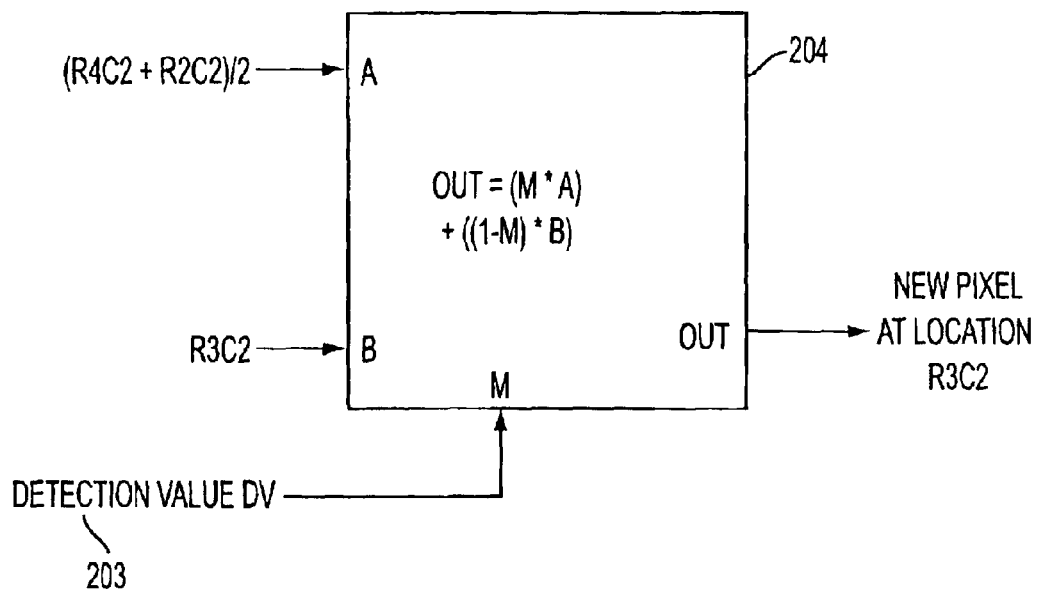
FIG. 13 is a block diagram of a mixing circuit of the present invention.

FIG. 13 is a block diagram of a mixing circuit 204 of the present invention. The DV 203 is preferably used in the mixing circuit 204. The mixing circuit 204 computes a new value for the pixel at location R3C2 of array 102. If no motion artifacts are detected, then the value of the DV 203 will be "0" and the mixing circuit 204 will output the original pixel R3C2. If the value of the DV 203 is "1", then the mixing circuit 204 will output the average of the pixels above and below R3C2, so the output of the mixing circuit 204 is the average of R2C2 and R4C2.

Figure 14:
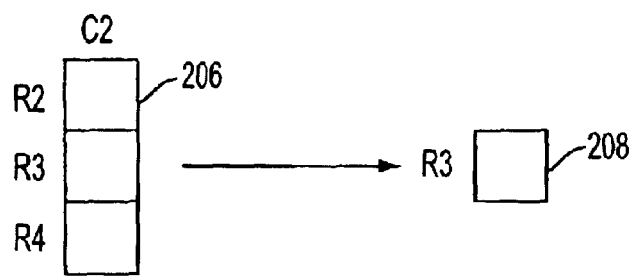
FIG. 14 is a diagram of an exemplary operation of the mixing circuit when the DV is greater than "0", but less than "1".

FIG. 14 is a diagram of an exemplary operation of the mixing circuit 204 when the DV 203 is greater than "0", but less than "1". The mixing circuit 204 uses information from the three-pixel array 206 by blending R3C2, and the average of R2C2 and R4C2 to form a new output pixel 208 at location R3C2. The DV 203 may also be used as a control in the methods for detecting diagonal features described below.

Figure 15:
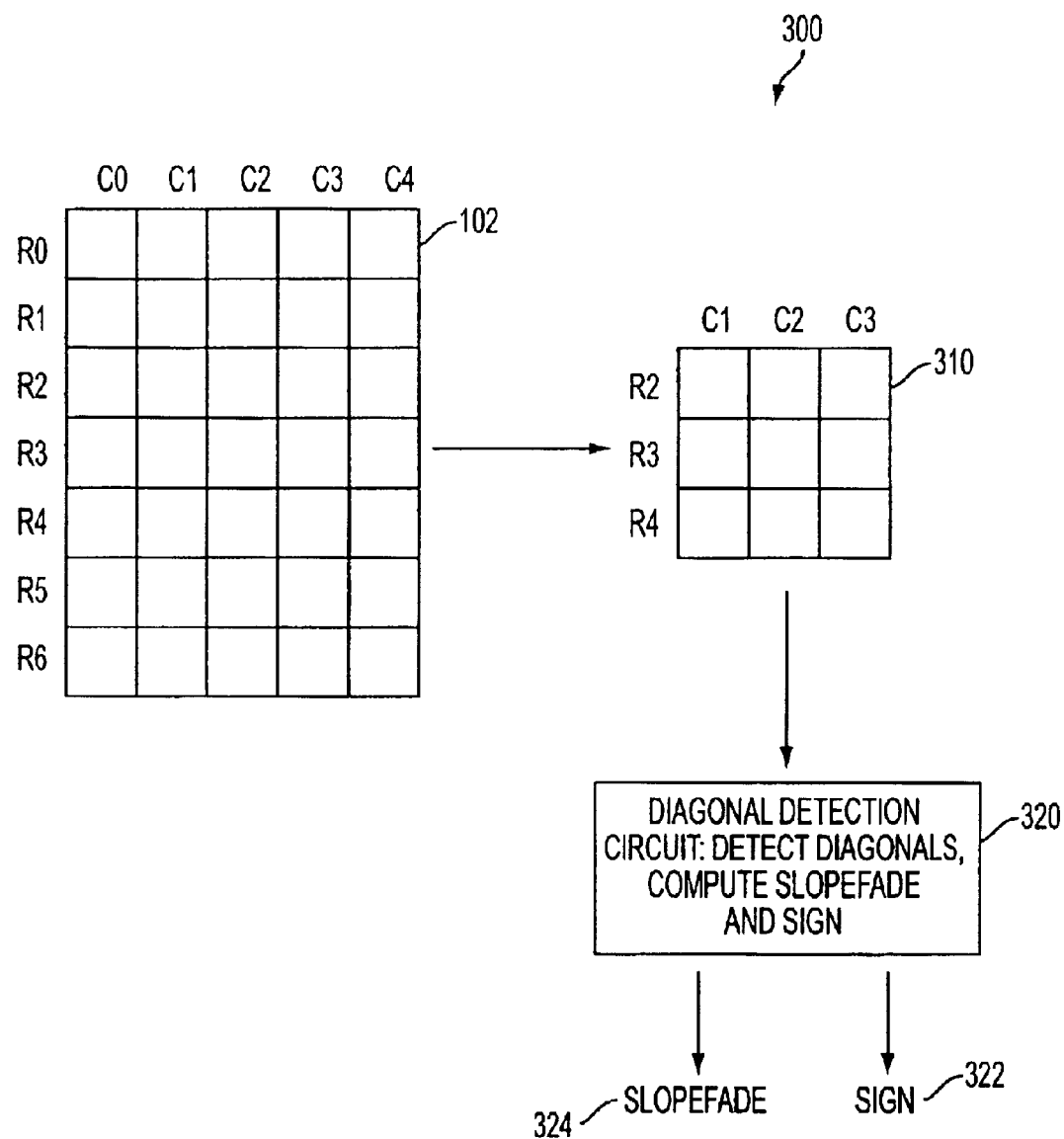
FIG. 15 is an illustration of a method for detecting diagonal features in accordance with the present invention.
Figure 18:
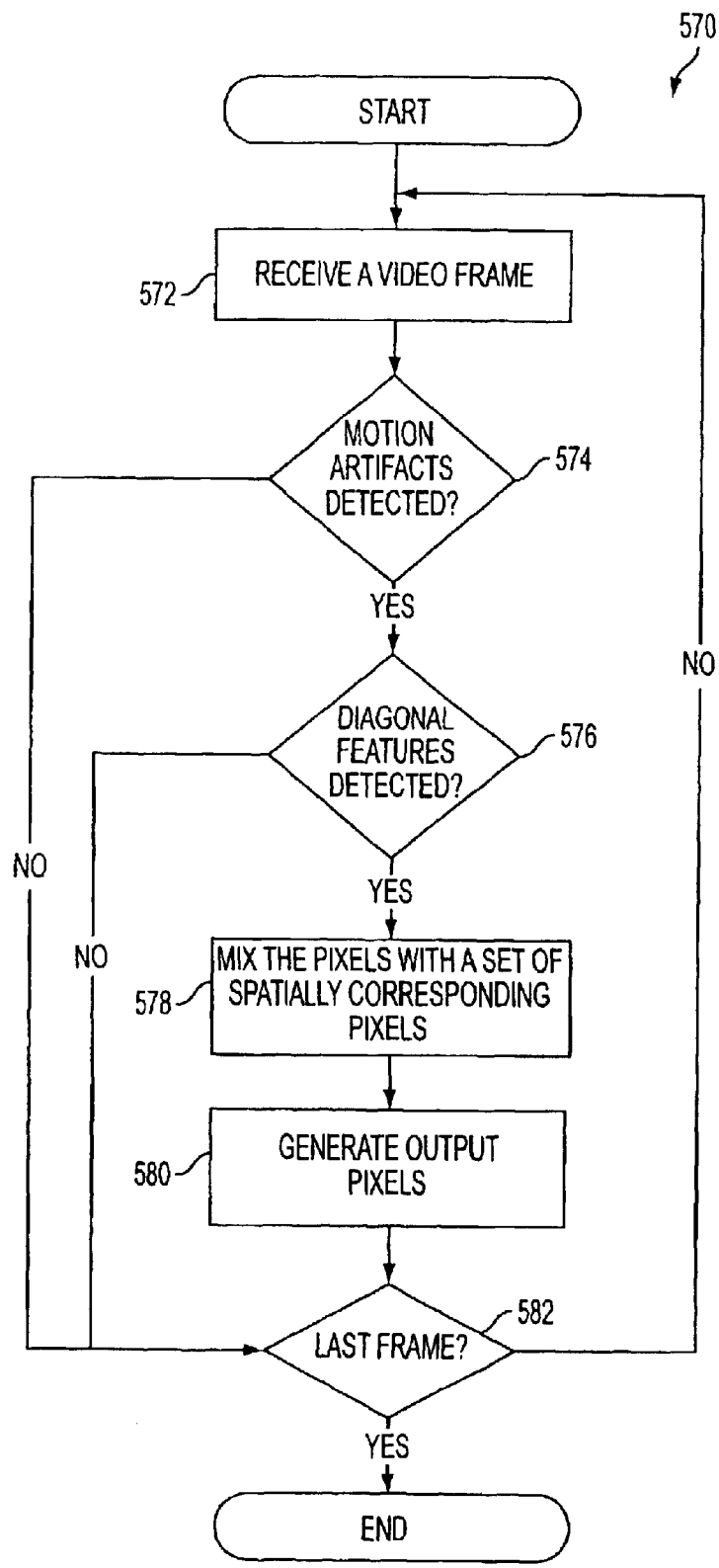
FIG. 18 is a flow chart of a diagonal detection method 570 in accordance with one embodiment of the present invention.

FIG. 15 is an illustration of a method 300 for detecting diagonal features. A secondary array 310 that is a subset of array 102 is input into a diagonal detection circuit 320 which operates in parallel to the frequency detection circuit 202 of FIG. 12. If no diagonal feature is detected, then the diagonal detection circuit 320 produces no output. However, if a diagonal feature is detected, the diagonal detection circuit 320 produces two outputs: a single bit Sign signal 322 and a multiple bit SlopeFade signal 324. The specific method for calculating the Sign and SlopeFade signals 322 and 324 is shown in FIG. 18 and its corresponding description.

The Sign signal 322 is used to determine which pair of pixels is diagonally adjacent to R3C2. The SlopeFade signal 324 is a measurement of the magnitude of a diagonal feature. Magnitude is determined by the amount of contrast along the diagonal feature. High contrast, such as a diagonal white line across a black background, will result in the highest values of the SlopeFade signal 324. A lower contrast results in a lower value for the SlopeFade signal 324.

Figure 16:
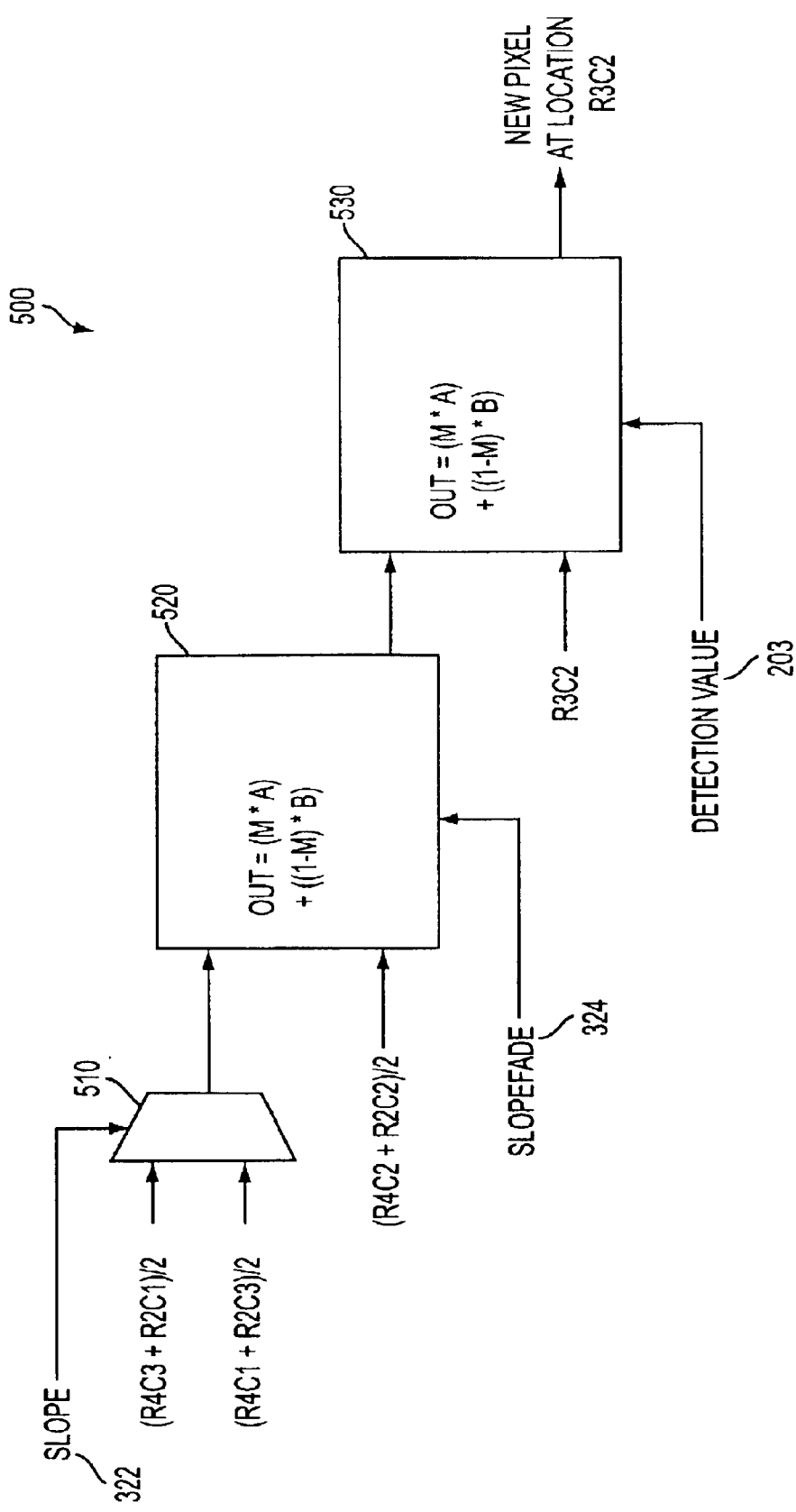
FIG. 16 is a block diagram of a diagonal mixing circuit of the present invention.

FIG. 16 is a block diagram of a diagonal mixing circuit 500 of the present invention. The diagonal mixing circuit 500 includes a multiplexer 510, a first mixer 520, and a second mixer 530. The multiplexer 510 relies on the Sign signal 322 to determine which pair of diagonally adjacent pixels are used. After a pair of diagonally adjacent pixels is chosen, the first mixer 520 blends the pixel values that are vertically adjacent to R3C2 with those that are diagonally adjacent to R3C2. The amount of blending is determined by the SlopeFade signal 324, which is proportional to the magnitude of the diagonal feature that is detected.

The second mixer 530 is the final mixing stage and is identical to the mixing circuit 204 shown in FIG. 13. The second mixer 530 produces an output that is determined by input pixel R3C2 and the output of the first mixer 520. The DV 203 is the control input for second mixer 530. In summary, the new pixel value at R3C2 is computed from pixel values from the array 310. The control signals for determining the final pixel value are the DetectionValue (DV) 203, the Sign signal 322 and the SlopeFade signal 324.

Figure 17:
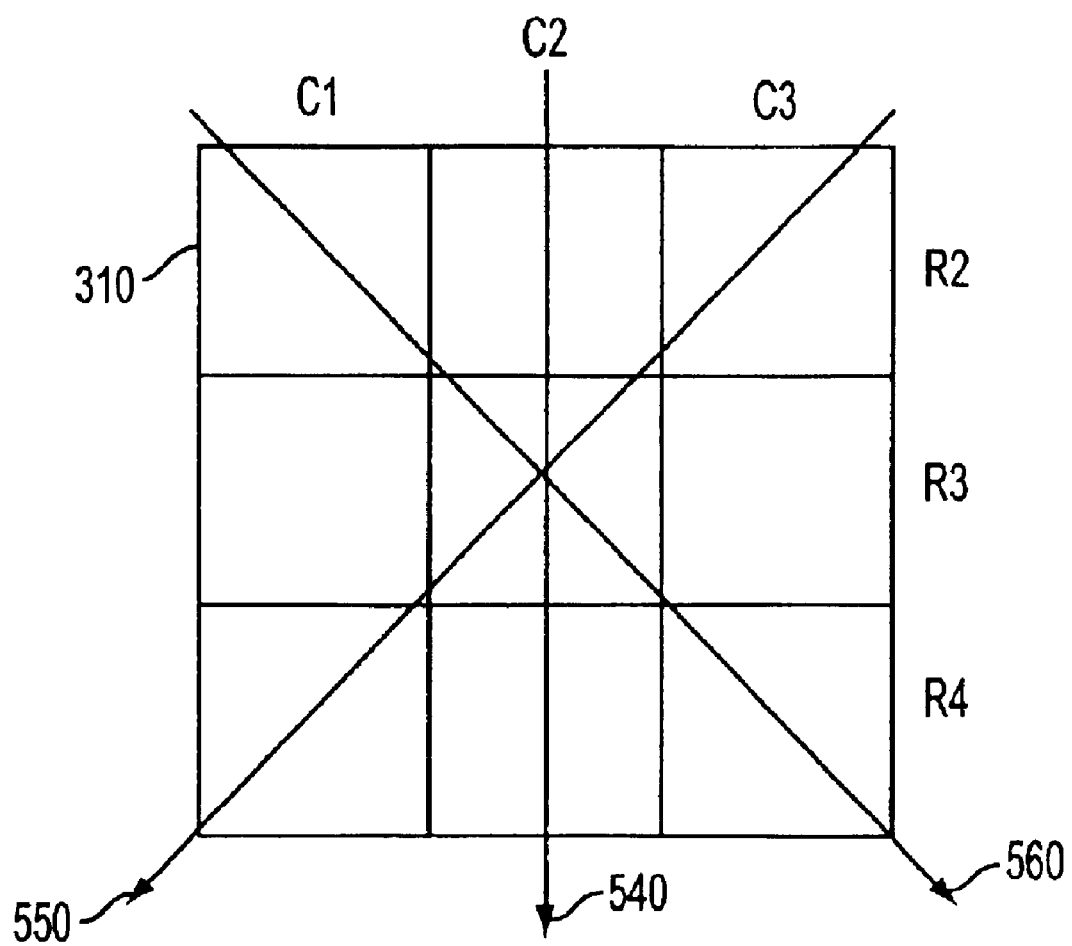
FIG. 17 is a diagram showing the pixels of secondary array used for calculating the output of the diagonal mixing circuit of FIG. 16.

FIG. 17 is a diagram showing the pixels of secondary array 310 used for calculating the output of the diagonal mixing circuit 500. If no diagonal features are detected within the secondary array 310, then the output of the mixing circuit is determined from the pixels along a line 540. If a diagonal feature is detected in circuit 320, the pixels that are diagonally adjacent to R3C2 along a line 550 or a line 560 are used to calculate the output pixel. The Sign signal 322 is used to determine which line 550 or 560 is used.

FIG. 18 is a flow chart of a diagonal detection method 570 in accordance with one embodiment of the present invention. Method 570 begins at an act 572 in which a video frame is received by the digital image processor. Motion artifacts are detected in the video frame by an act 574 through frequency analysis of each pixel. If motion artifacts are not detected in the video frame, method 570 returns to act 572 upon which a new video frame is received, unless it is determined that the last frame has been examined in an act 582. If motion artifacts are detected in a pixel, then an act 576 determines if diagonal features are present in the area surrounding the pixel. If not, method 570 returns to act 572 again through act 582.

If diagonal features are detected, then the pixel is mixed with a set of spatially corresponding pixels as described above to smooth the diagonal feature in an act 578. The resulting mixed pixel is then used to generate an output pixel in an act 580. Act 582 then determines whether method 570 has reached the last video frame to be detected. If the last frame has not been reached, method 570 returns to act 572. If the last frame has been reached, then method 570 ends.

Figure 19:
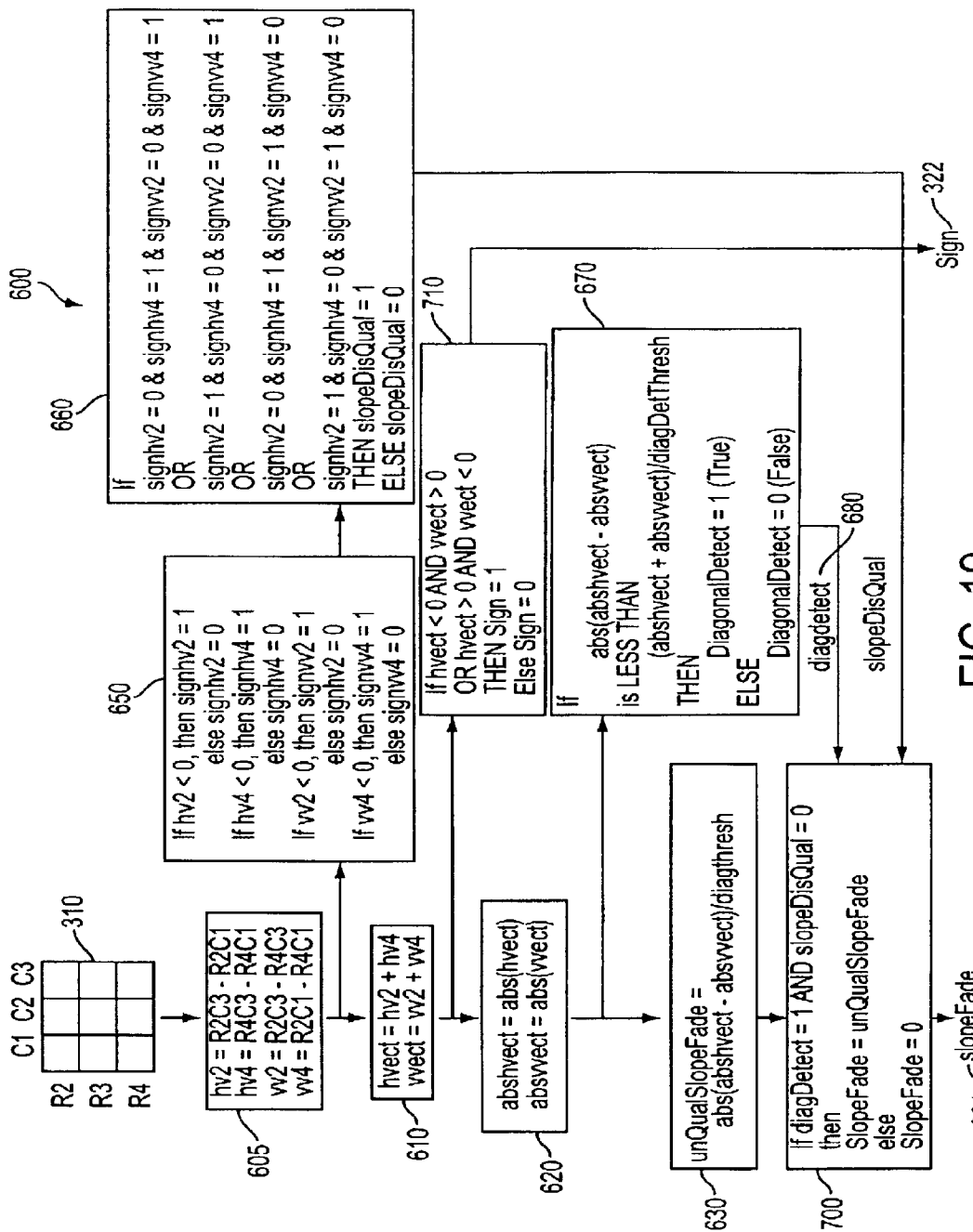
FIG. 19 is a flow chart of a diagonal detection method, which illustrates method of FIG. 18 in greater detail.

FIG. 19 is a flow chart of a diagonal detection method 600, which illustrates method 570 in greater detail. The method 600 shows the flow of logical and mathematical acts used to compute the SlopeFade signal 324 and the Sign signal 322 from the pixel array 310. The corner pixels are divided into two horizontal pairs and two vertical pairs by an act 605. The horizontal pairs are labeled hv2 and hv4 and the two vertical pairs are labeled vv2 and vv4. Differences are computed for each pair of corner pixel values by subtraction, producing a pair of horizontal differences and a pair of vertical differences.

In an act 610, the two horizontal and vertical differences are summed to produce a horizontal and vertical difference vector for the array 310. An act 620 computes the absolute value of the horizontal and vertical difference vectors. A thresholding value is used to adjust the magnitude of the SlopeFade output 324 in an act 630. The output of act 630 is an unqualified SlopeFade signal (unQualSlopeFade) that is still subject to being "zeroed out" by the DiagDetect signal and the SlopeDisQual signal produced by parallel acts of the method 600.

The signs of the horizontal and vertical differences from act 605 are recorded and stored in an act 650. The signs indicate whether the act 605 resulted in positive or negative numbers. Then, in an act 660 looks for cases where the signs of the horizontal and vertical difference acts are in opposition to each other. If such cases are found, then SlopeDisQual is set to "1". If the signs of the difference acts are not in opposition, then SlopeDisQual is "0".

In act 660, the diagonal detector looks for diagonal features that are relatively large; in particular, the feature must be larger than the nine-pixel array 310 used as the input to the diagonal processor. Image features that are smaller than the array 310 can cause the diagonal processing to incorrectly detect a diagonal feature. These small features can be detected by observing the signs and setting SlopeDisQual accordingly.

An act 670 compares the magnitude of the horizontal and vertical vectors computed in act 620 in to detect a diagonal feature. Then, the DiagDetect signal is produced in an act 680 using the horizontal and vertical vectors. The ratio of the difference of the horizontal and vertical vectors and the sum of the horizontal and vertical vectors is adjusted by a threshold value, diagDetThresh.

A final SlopeFade output is computed in an act 700 which uses two single bit inputs are used to qualify the SlopeFade output. The first bit is a DiagonalDetect bit and the second bit is a SlopeDisQual bit. SlopeFade will be zero if DiagDetect is 0 or if SlopeDisQual is a 1, otherwise, SlopeFade will take the value of unQualSlopeFade. The SlopeDisQual signal changes the SlopeFade signal to zero for cases where the slope of the diagonal feature can not be reliably calculated. Finally, the Sign signal 322 is computed in an act 710 using the sign bits produced by the sums of the horizontal and vertical vectors performed in act 610. The Sign signal 322 is computed using this logical act to determine the slope of the diagonal feature.

Figure 20:
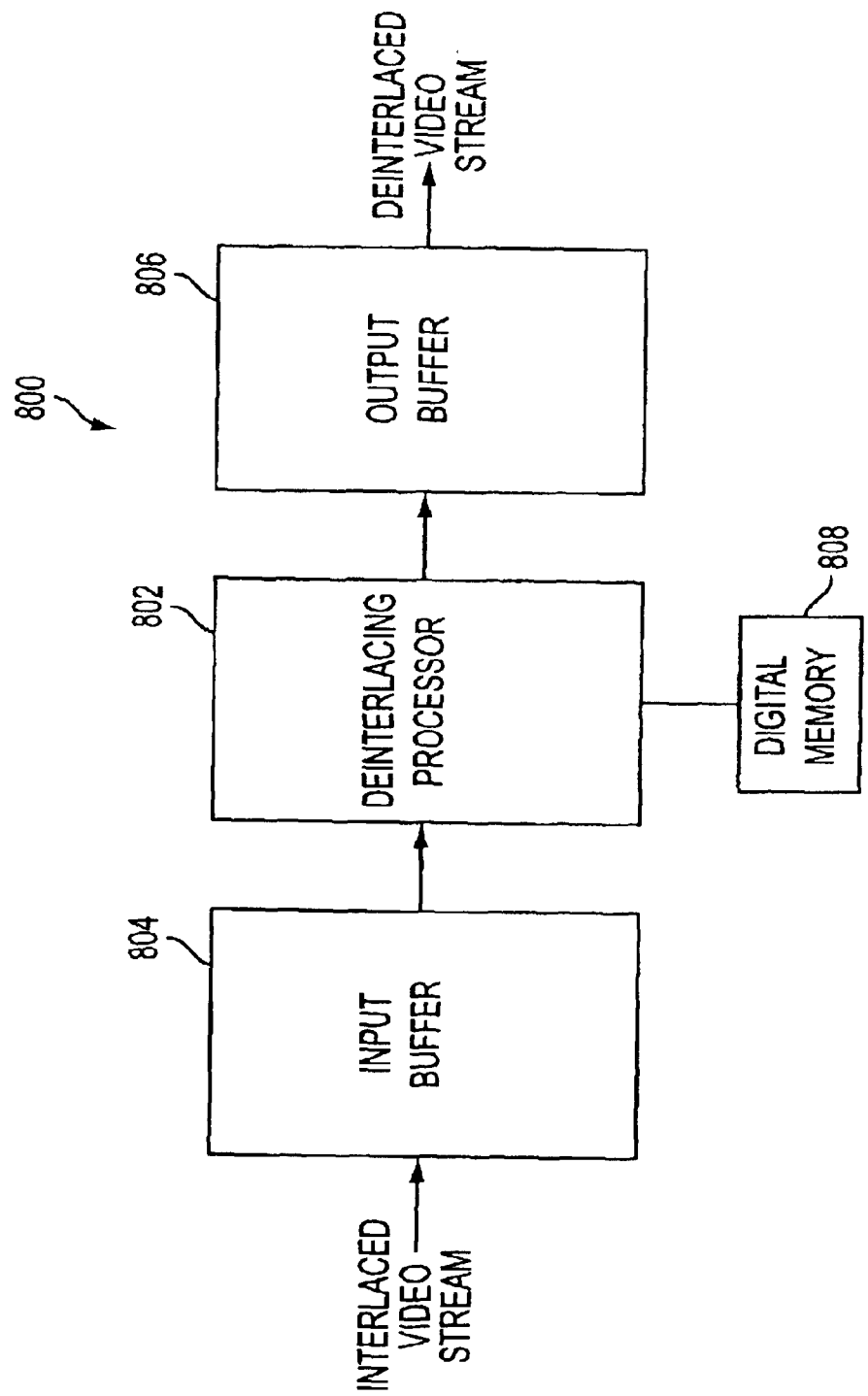
FIG. 20 is a block diagram of a digital image processor of the present invention.

Figure 20 is a block diagram of a digital image processor of the present invention. It will therefore be appreciated that the present invention provides a method and apparatus for smoothing of diagonal features in video images. This is accomplished by providing a digital image processor 800 having a deinterlacing processor 802 coupled between an input buffer 804 operable to receive an interlaced video stream and an output 806 operable to transmit a deinterlaced video stream. The deinterlacing processor is also coupled to a digital memory 808 for storing portions of the interlaced video signal. The deinterlacing processor is operable to detect the diagonal features in the portions of the received interlaced video stream and to generate the deinterlaced video stream having smoothed diagonal features.

The digital image processor is used to perform frequency analysis to detect the presence of motion artifacts and the magnitude of such motion artifacts. Diagonal features in the pixels with motion artifacts are then detected. A set of spatially corresponding pixels is chosen based on the diagonal feature detection information and then mixed with the pixel. The pixel is then used to generate an output pixel while using the magnitude of the motion artifacts as a control. The combination of these techniques results in a low-artifact deinterlaced image with smooth diagonal features.

Other embodiments of the invention will be apparent to those skilled in the art from consideration of the specification and practice of the invention. Furthermore, certain terminology has been used for the purposes of descriptive clarity, and not to limit the present invention. The embodiments and preferred features described above should be considered exemplary, with the invention being defined by the appended claims.

What is claimed is:

1. A method for deinterlacing an interlaced video stream comprising:

receiving a video frame including a plurality of pixels from an input of said interlaced video stream;

analyzing frequency information inherent to said video frame in order to detect motion artifacts;

detecting diagonal features surrounding said plurality of pixels in said video frame if a motion artifact is detected; and mixing each of said plurality of pixels with a set of spatially corresponding pixels to generate an output pixel.

2. A method for deinterlacing an interlaced video stream as recited in claim 1, wherein said analyzing frequency information and said detecting diagonal features are performed in parallel.

3. A method for deinterlacing an interlaced video stream as recited in claim 1, further comprising determining a slopefade signal, said slopefade signal having a value proportional to the magnitude of the detected diagonal features.

4. A method for deinterlacing an interlaced video stream as recited in claim 3, further comprising determining a sign signal, said sign signal providing information regarding the slope of the detected diagonal features.

5. A digital image processor as recited in claim 4, further comprising qualifying the slopefade signal with a slopedisqual signal, said slopedisqual signal determining whether the diagonal feature has been reliably detected.

6. A digital image processor as recited in claim 5, wherein the set of spatially corresponding pixels includes a first averaged pixel and a second averaged pixel.

7. A digital image processor as recited in claim 6, wherein the first averaged pixel is the average of one of two pairs of diagonally corresponding pixels chosen based on the sign signal.

8. A digital image processor as recited in claim 7, wherein the second averaged pixel is the average of two pixels that are vertically adjacent to each of the plurality of pixels.

9. A digital image processor as recited in claim 8, further comprising mixing the first averaged pixel and the second averaged pixel, using the slopefade signal as a control.

10. A method for deinterlacing an interlaced video stream comprising:

receiving a video frame including a plurality of pixels from an input of said interlaced video stream;

analyzing frequency information inherent to said video frame in order to detect motion artifacts in said video frame;

determining a plurality of motion artifact detection values for said plurality of pixels in said video frame;

detecting diagonal features surrounding said plurality of pixels in said video frame if a motion artifact is detected; and mixing each of said plurality of pixels with a set of spatially corresponding pixels to generate an output pixel.

11. A method for deinterlacing an interlaced video stream as recited in claim 10, wherein said analyzing frequency information and said detecting diagonal features are performed in parallel.

12. A method for deinterlacing an interlaced video stream as recited in claim 10, further comprising determining a slopefade signal, said slopefade signal having a value proportional to the magnitude of the detected diagonal features.

13. A method for deinterlacing an interlaced video stream as recited in claim 12, further comprising determining a sign signal, said sign signal providing information regarding the slope of the detected diagonal features.

14. A method for deinterlacing an interlaced video stream as recited in claim 13, further comprising qualifying the slopefade signal with a slopedisqual signal, said slopedisqual signal determining whether the diagonal feature has been reliably detected.

15. A method for deinterlacing an interlaced video stream as recited in claim 14, wherein the set of spatially corresponding pixels includes a first averaged pixel and a second averaged pixel.

16. A method for deinterlacing an interlaced video stream as recited in claim 15, wherein the first averaged pixel is the average of one of two pairs of diagonally corresponding pixels chosen based on the sign signal.

17. A method for deinterlacing an interlaced video stream as recited in claim 16, wherein the second averaged pixel is the average of two pixels that are vertically adjacent to each of the plurality of pixels.

18. A method for deinterlacing an interlaced video stream as recited in claim 17, further comprising mixing the first averaged pixel and the second averaged pixel, using the slopefade signal as a control.

* * * * *